Patented Feb. 5, 1924.

1,482,939

UNITED STATES PATENT OFFICE.

JAMES McINTOSH, OF NORRISTOWN, PENNSYLVANIA, ASSIGNOR TO DIAMOND STATE FIBRE COMPANY, OF ELSMERE, DELAWARE, A CORPORATION OF DELAWARE.

PROCESS OF MAKING CARBON.

No Drawing. Application filed June 24, 1921. Serial No. 480,207.

*To all whom it may concern:*

Be it known that I, JAMES McINTOSH, a citizen of the United States, residing in Norristown, Pennsylvania, have invented Processes of Making Carbon, of which the following is a specification.

One object of my invention is to provide a relatively inexpensive, dense, structurally strong, relatively pure form of carbon, especially adapted for use in the manufacture of iron and steel for use in the electrical, pharmaceutical and chemical arts and for various other purposes such as a filtering medium, the invention further contemplating the use of a novel process for the production of this material.

In carrying out my invention I vulcanize or parchmentize paper, wood pulp or other relatively pure form of cellulose, preferably in the form of webs, which after being run through a vulcanizing or parchmentizing bath, are wound upon a heated roller while subjected to heavy pressure. After the annular structure thus formed has been cut and moved from the roller it is repeatedly washed with water until the vulcanizing or parchmentizing chemicals are removed and it is then usually dried.

The dried vulcanized or parchmentized fibre is then placed in a suitable retort and heated to such a temperature that all its volatile constituents are driven off, after which it is removed from the retort and may be subjected to cutting or pulverizing to suit it for use in filters, though it may be used in lump form when employed in iron or steel manufacture. Owing to the fact that the dried vulcanized fibre prior to its introduction into the retort has been rendered exceedingly dense and tough by the pressure to which it was originally subjected as well as by reason of the action of the parchmentizing chemicals and the subsequent drying, the finished product of my process is a relatively dense, hard and structurally strong form of carbon. At the same time it is of necessary porosity to fit it for the filtering of sugar solutions and similar substances now filtered by the use of bone black.

In its final form my product is tough and of a uniform porosity, having no tendency to disintegrate or form powder and as it has no tendency to pack, is especially adapted also for use in gas masks.

It is to be understood that in the production of the relatively pure granular carbon above described, I may in accordance with my invention utilize scraps and otherwise waste pieces of parchmentized or vulcanized fibre, thereby producing from what is now a valueless by-product a body having considerable commercial value.

I claim:

The process which consists in parchmentizing vegetable fibrous material; subjecting said material to heat and to a pressure above that of the atmosphere; washing the parchmentizing chemicals from the parchmentized material; and carbonizing the washed product.

JAMES McINTOSH.